June 27, 1967  I. J. ALLEN  3,327,676
SPEEDOMETER
Filed Jan. 4, 1965  2 Sheets-Sheet 1
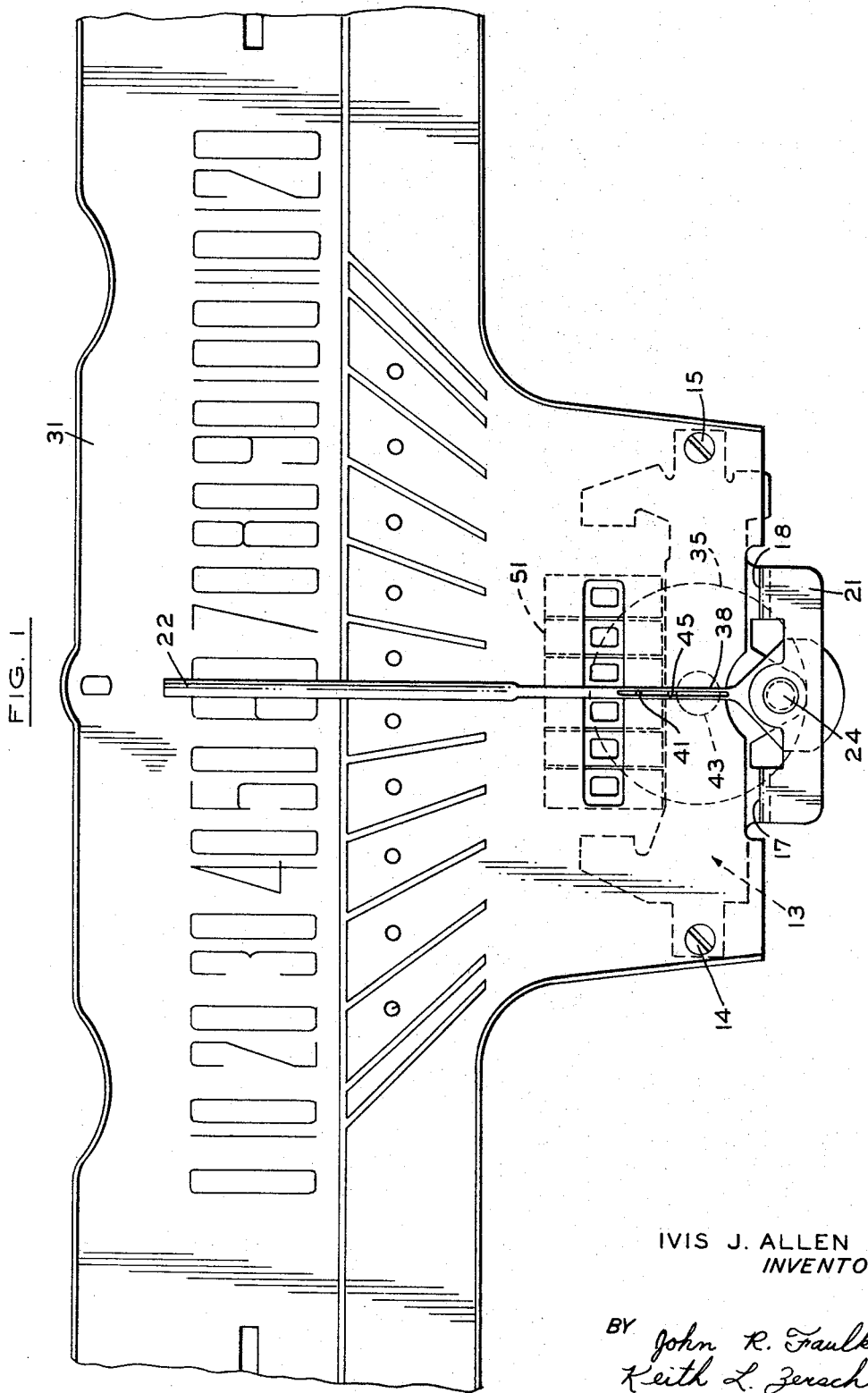
IVIS J. ALLEN
INVENTOR
BY John R. Faulkner
Keith L. Zerschling
ATTORNEYS June 27, 1967  I. J. ALLEN  3,327,676
SPEEDOMETER
Filed Jan. 4, 1965  2 Sheets-Sheet 2
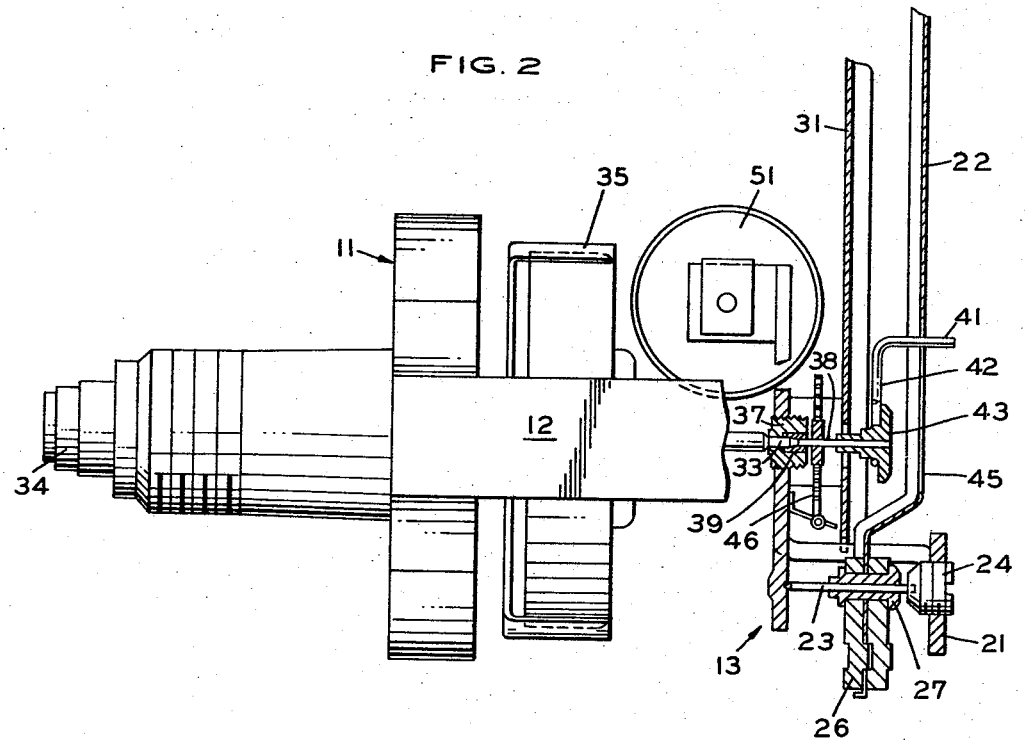
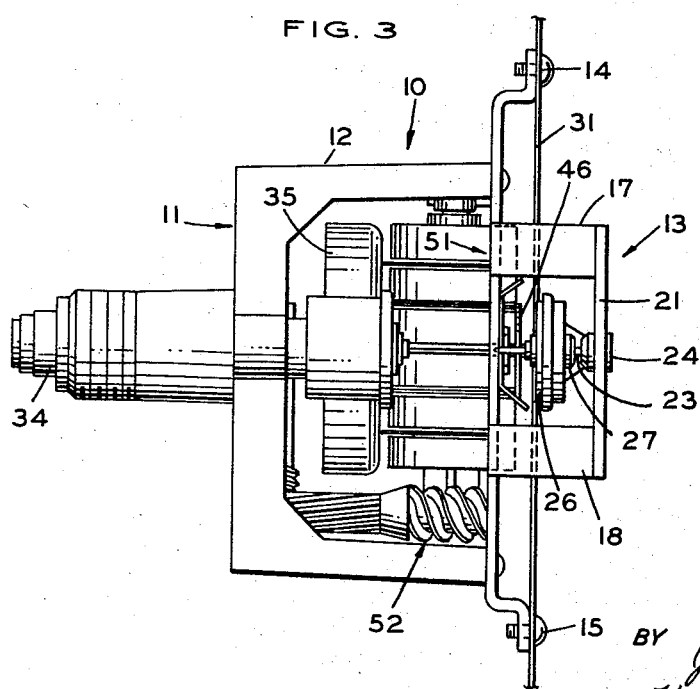
IVIS J. ALLEN
INVENTOR
BY John R. Faulkner
Keith L. Zerschling
ATTORNEYS United States Patent Office 3,327,676
Patented June 27, 1967

3,327,676
SPEEDOMETER
Ivis J. Allen, Ann Arbor, Mich., assignor to Ford Motor Company, Dearborn, Mich., a corporation of Delaware
Filed Jan. 4, 1965, Ser. No. 422,990
6 Claims. (Cl. 116—116)

ABSTRACT OF THE DISCLOSURE

A speedometer mechanism includes rectilinear scale divided into equal increments across the greater portion of the length thereof, a pointer pivotally mounted at a point spaced below the scale, and an output shaft located intermediate the scale and the pivot point of the pointer. The output shaft rotatively supports an "L" shaped arm. The arm has a portion extending parallel to the pointer and a portion extending parallel to the shaft received in a slot of the pointer to rotate the pointer in response to rotation of the output shaft. The location of the portion of the arm received in the slot is such that the pointer is moved across equal lengths of the rectilinear scale in response to equal increases in the speed of the vehicle.

---

This invention relates to a speedometer for an automotive vehicle, and more particularly to a speedometer for an automative vehicle employing a rectilinear or chordal scale in which means are employed for causing the speedometer pointer to traverse equal segments of the rectilinear or chordal scale of the speedometer per equal increment of angular displacement of the speedometer output shaft.

In conventional speedometers using chordal or rectilinear scales and a pivotal pointer, the scale segments denoting equal increments of speed must be expanded at each end and must be contracted at the center of the scale to provide accurate speed readings. This causes poor readability, particularly at the center of the scale, for example, in the range of 30 to 70 miles an hour where most of the driving is done, and it also causes an objectionable appearance.

In the present invention, means are provided for using a chordal or rectilinear scale in which the increments of speed are equally spaced along this scale over a majority of the scale or indicator dial. The scale may be contracted slightly toward the extreme ends, but this does not present any substantial disadvantage. Means are coupled to the output shaft of the speedometer that is angularly displaced proportional to vehicle speed and to the pointer for causing the pointer to traverse equal increments of vehicle speed on the chordal or rectilinear scale for equal increments of angular displacement of the output shaft of the speedometer mechanism. Thus, the vehicle speed will be shown in a linear fashions on the chordal or rectilinear scale of the speedometer.

The means mentioned above for causing the movement of the speedometer pointer to traverse equal segments of the chordal scale of the speedometer per equal increment of angular displacement of the output shaft includes means for mounting the speedometer output shaft in radial spaced relationship from the pivotal mounting of the speedometer pointer. A slot may be provided in the pointer and a means carried by the output shaft and radially spaced therefrom is positioned in the slot such that as the speedometer output shaft is angularly displaced proportional to vehicle speed, the pointer traverses equal segments of the chordal or rectilinear scale for equal increments of angular displacement of the output shaft.

An object of the invention is the provision of an automotive vehicle speedometer employing a chordal or rectilinear scale in which a pivotally mounted speedometer pointer traverses equal segments of the chordal or rectilinear scale for equal increments of vehicle speed.

A further object of the invention is the provision of a straight line linear scale pointer type speedometer that is accurate and easily readable.

Other objects and attendant advantages of the invention will become more readily apparent as the specification is considered in connection with the attached drawings, in which:

FIGURE 1 is a front elevational view of the speedometer of the present invention;

FIGURE 2 is a sectional view taken along the lines 2—2 of FIGURE 1, and

FIGURE 3 is a bottom plan view of the speedometer of the invention.

Referring now to the drawings in which like reference numerals designate like parts throughout the several views thereof, there is shown a speedometer 10 for use in an automotive vehicle. The speedometer 10 includes a frame 11 having a generally U-shaped member 12 with an open end to which is attached a bridge member 13 by any suitable fastening means, for example, screws 14 and 15. The bridge member 13 comprises a substantially planar portion 16 positioned across the open end of U-shaped member 12 and suitably affixed thereto. The bridge member 13 also includes pair of forwardly extending arms 17 and 18 which support and are integrally formed with a substantially planar portion 21 positioned in parallel relationship to the planar portion 16.

A speedometer pointer 22 is pivotally mounted by the two planar portions 16 and 21 of the bridge member 13. This is done in a conventional way by means of a staff or shaft 23 supported rotatably in an indentation in the planar portion 16 of the bridge member 13 and by an indentation in an adjustable plastic bearing member 24 threadingly received in the planar portion 21 of the bridge member 13. The speedometer pointer 22 is counterweighted in a conventional way by counterweights 26 that are secured to the main body of the pointer by means of a hollow rivet 27 to which the pivotal shaft 23 is nonrotatably attached.

The speedometer pointer 22 swings in a circular arc the center of which is the axis of the staff or shaft 23 and it indicates speed on a chordal or rectilinear scale 31 which has equal increments of speed laid off in equal linear segments over a majority of the scale, for example, from 10 to 110 miles per hour.

It is well known that in conventional speedometers, the speedometer pointer which is attached to the output shaft of the speedometer swings in an arc. If a rectilinear or chordal scale with equal linear divisions for equal increments of vehicle speed is used, errors in the readings will result since the movement of the pointer as it moves proportional to the angular displacement of the output shaft of the speedometer gives true readings only along the arc through which it moves.

In order to provide accurate readings for the speedometer, the output shaft 33 of the speedometer is positioned in radially spaced relationship from the pivotal point of the pointer 22 as defined by the axis of the shaft 23. As is conventional in automotive vehicles, an eddy current speed cup mechanism, generally designated by the numeral 35, is employed to convert the angular speed of shaft 34 that rotates at a speed proportional to vehicle speed into an angular displacement of the output shaft 33 proportional to vehicle speed.

The shaft 33 is supported in the planar portion 16 of the bridge member 13 by a bearing member 37, and is coupled to a staff or shaft 38 by a coupling 39 rotatably supported within the bearing 37. The staff or shaft 38 has a pin 41 suitably affixed thereto in radially spaced relationship by an integrally formed arm 42 which is non-rotatably secured to the staff or shaft 38 by a fastening means or bushing assembly 43.

The pin 41 extends in a generally parallel relationship to the output shaft 33 of the speedometer, the shaft or staff 38, and also to the shaft 23 that pivotally supports the pointer 22. The pin 41 is positioned in a slot 45 in the pointer 22. This slot is elongated so that it will provide sufficient freedom to permit the pin 41 to move in the slot over the entire range of speeds to be indicated.

A conventional hair spring 46 is affixed to the shaft or staff 38 and to the planar member 16 of the bridge member 13 to bias the pointer toward the zero position. It is understood, of course, that the eddy current speed cup mechanism 35 moves the output shaft 33 and the staff 38 against the bias of this hair spring in proportion to vehicle speeds.

In addition, the conventional odometer mechanism 51, run through gearing 52 connected to shaft 34, is employed in the system to give the vehicle operator an indication of distance traveled by the vehicle.

As shown on the drawings, the centers of the scale 31, the output shaft 33, the shaft or staff 38, and the shaft or staff 23, are located in a straight line which is perpendicular to the scale 31. Thus, the point of rotation of the output shaft of the speedometer, the pivotal mounting of the pointer, and the center of the scale are located on this straight line that is perpendicular to the linear scale 31. In this connection, it should be noted that the radial distance from the output shaft 33 and the shaft or staff 38 to the pin 41 is less than the radial distance from the output shaft 33 and shaft or staff 38 to the shaft or staff 23 that pivotally supports the pointer 22.

It has been found that with this geometry, that the pointer 22 traverses equal segments of the rectilinear or chordal scale 31 on a linear basis for equal angular displacements of the speedometer output shaft 33. With the construction shown, absolute linearity of the chordal scale 31 is achieved for 70° of the travel of the pointer 22, and only small discrepancies for pointer travel greater than 70°. For example, it has been found that in designing this speedometer for an automotive vehicle, that complete linearity of the chordal or rectilinear scale 31 from 10 to 110 miles per hour may be achieved on a 120 mile an hour scale. At either end of the scale, that is from 0 to 10 miles per hour and from 110 to 120 miles per hour, the linear scale is contracted to a certain extent. This is not considered to be a disadvantage, however, particularly at the low range where it is conventional to stop the pointer at a few miles an hour above the zero indication when the vehicle is at rest.

In the operation of the invention, means, not shown, are connected to the input shaft 34 of the speedometer 10 to rotate this shaft at a speed proportional to vehicle speed. The eddy cup mechanism 35 converts the speed of the shaft 34 into an angular displacement of the output shaft 33 and staff 38, that is proportional to vehicle speed. When the pin 41 is moved in its circular arc about the center of the output shaft 33 and the shaft or staff 38, it engages the pointer 22 through the sides of the slot 45 and moves it against the bias of the hair spring 46 across the rectilinear or chordal scale 31 such that the pointer 22 traverses equal segments of the chordal scale marked off by the numbers and gradations appearing thereon per equal increment of angular displacement of the output shaft 33 and staff 38 of the speedometer. Thus the pointer 22 traverses equal segments of the chordal or rectilinear scale 31 for equal increments of vehicle speed. This is true with the exception of the very ends of the scale, for example, from 0 to 10 miles an hour and 110 to 120 miles an hour where the scale is slightly contracted.

The present invention thus provides, in an inexpensive mechanism, a chordal linear scale for an automotive vehicle speedometer in which the speedometer pointer traverses equal segments of a chordal or rectilinear scale for equal angular displacements of the output shaft of the speedometer that is displaced in proportion to vehicle speed. This has the advantage of good readability for the vehicle operator and a pleasing styling and aesthetic appearance.

It is to be understood that this invention is not to be limited to the exact construction shown and described, but that various changes and modifications may be made without departing from the spirit and scope of the invention as defined in the appended claims.

I claim:

1. In a speed measuring device for an automotive vehicle, a frame, a rectilinear scale mounted on said frame and having a major portion thereof marked off in equal increments to indicate equal increments of vehicle speed, a pointer pivotally mounted at one end in said frame and extending toward said rectilinear scale, a shaft mounted in said frame intermediate said rectilinear scale and the position where said pointer is pivotally mounted, means extending radially from said shaft and including means extending generally parallel to said shaft, a slot in said pointer receiving said last mentioned means, and means coupled to said shaft adapted to rotate said shaft through an angular displacement proportional to the speed of the vehicle.

2. A speedometer for an automotive vehicle comprising, a frame, a rectilinear scale mounted on said frame and having a major portion thereof marked off in equal increments to indicate equal increments of speed, a pointer pivotally mounted at one end in said frame and extending toward said linear scale, a shaft mounted in said frame intermediate said linear scale and the position where said pointer is pivotally mounted, and means coupling said shaft and said pointer for angularly displacing said pointer in a linear fashion with respect to said scale as said shaft is angularly displaced, and means coupled to said shaft and adapted to angularly displace said shaft as a function of vehicle speed.

3. A speedometer for an automotive vehicle comprising, a frame, a rectilinear scale mounted on said frame and having a major portion thereof marked off in equal increments to indicate equal increments of vehicle speed, a pointer pivotally mounted at one end thereof on said frame and extending toward said linear scale, a shaft mounted in said frame intermediate said linear scale and the position where said pointer is pivotally mounted, means coupling said shaft and said pointer for causing said pointer to traverse equal increments of said rectilinear scale per increment of angular displacement of said shaft, and means coupled to said shaft for anguarly displacing said shaft in proportion to vehicle speed.

4. A speedometer for an automotive vehicle comprising, a frame, a rectilinear scale mounted on said frame and having a major portion thereof market off in equal increments to indicate equal increments of vehicle speed, a pointer pivotally mounted at one end thereof on said frame and extending toward said linear scale, a shaft mounted on said frame in a radially offset position with respect to the pivotal position of said pointer, and means coupling said shaft and said pointer for causing said pointer to traverse equal increments of said linear scale per increment of angular displacement of said shaft, and means coupled to said shaft for angularly displacing said shaft in proportion to engine speed.

5. A speedometer for an automotive vehicle comprising, a frame, a rectilinear scale mounted on said frame and having a major portion thereof marked off in equal increments to indicate equal increments of vehicle speed, a shaft rotatably mounted in said frame, a pin extending generally parallel to said shaft, means coupling said pin to said shaft at a radially spaced distance from said shaft, a pointer pivotally mounted on said frame at a position on the same side of said linear scale but a greater distance therefrom, said pointer being radially spaced from said shaft at a greater distance than said pin, a slot positioned in said pointer for receiving said pin, and means coupled to said shaft for angularly displacing said shaft proportional to vehicle speed whereby said pointer traverses equal segments of said linear scale per equal increments of angular displacement of said shaft.

6. The speedometer of claim 5 in which the center of said rectilinear scale, the center of said shaft and the center of the pivotal mounting of said pointer are located in a straight line substantially perpendicular to said rectilinear scale.

References Cited

UNITED STATES PATENTS

| | | | |
|---|---|---|---|
| 971,334 | 9/1910 | Whalen | 116—57 |
| 1,227,283 | 5/1917 | McNeill | 116—57 |
| 2,142,248 | 1/1939 | Le Fevre et al. | 73—519 |
| 2,943,595 | 7/1960 | Atwood | 116—116 |

FOREIGN PATENTS

| | | |
|---|---|---|
| 387,319 | 12/1923 | Germany. |
| 579,830 | 7/1933 | Germany. |

LOUIS J. CAPOZI, *Primary Examiner.*